United States Patent
Sinojima

(10) Patent No.: US 7,618,341 B2
(45) Date of Patent: Nov. 17, 2009

(54) TRANSMISSION CONTROL DEVICE FOR CONTINUOUSLY VARIABLE TRANSMISSION APPARATUS FOR VEHICLES

(75) Inventor: Takumi Sinojima, Kanagawa (JP)

(73) Assignee: NSK Ltd., Tokyo (JP)

( * ) Notice: Subject to any disclaimer, the term of this patent is extended or adjusted under 35 U.S.C. 154(b) by 367 days.

(21) Appl. No.: 11/751,430

(22) Filed: May 21, 2007

(65) Prior Publication Data
US 2008/0058155 A1 Mar. 6, 2008

(30) Foreign Application Priority Data
May 19, 2006 (JP) .............................. 2006-139659

(51) Int. Cl.
F16H 37/02 (2006.01)
(52) U.S. Cl. ...................... 475/217; 475/207; 475/216; 477/38; 477/39
(58) Field of Classification Search ................. 475/207, 475/208, 214, 215, 216, 217, 218; 477/37, 477/38, 39; 476/39, 40
See application file for complete search history.

(56) References Cited

U.S. PATENT DOCUMENTS 6,569,052 B2 * 5/2003 Sakai et al. ................. 475/214
6,716,128 B2 * 4/2004 Kuramoto et al. ........... 475/207
6,991,575 B2 * 1/2006 Inoue ......................... 475/216

FOREIGN PATENT DOCUMENTS

| JP | 2004-225888 A | 8/2004 |
| JP | 2004-245326 A | 9/2004 |
| JP | 2005-291486 A | 10/2005 |
| JP | 2005-315672 A | 11/2005 |

OTHER PUBLICATIONS

Separate Volume "Best Car" Red Badge Series 245/Book for Easy Understanding of Latest Mechanisms of Vehicles, published on Dec. 20, 2000 by Sansuisha Co. Ltd/Kodansha Co. Ltd, p. 94-95.
Aisin Seiki—Products/Enterprise "Drive Train Relation", Aisin Seiki Co., Ltd. www.aisin.co.jp/product/auto/drive/index.html, retrieved Mar. 30, 2006.

* cited by examiner

Primary Examiner—David D. Le
(74) Attorney, Agent, or Firm—Sughrue Mion, PLLC

(57) ABSTRACT

In a continuously variable transmission apparatus, by adjusting the transmission ratio of a toroidal continuously variable transmission, an output shaft can be stopped while an input shaft is left rotating in one direction by a drive source. And, when, while the vehicle is running, a select lever is operated to a select position in the reverse direction to the vehicle running direction, in a state where a clutch device is connected, the speed ratio of the continuously variable transmission apparatus is changed from a value corresponding to the vehicle running state to a value 0 capable of realizing the above-mentioned stopping state along a preset condition.

6 Claims, 10 Drawing Sheets

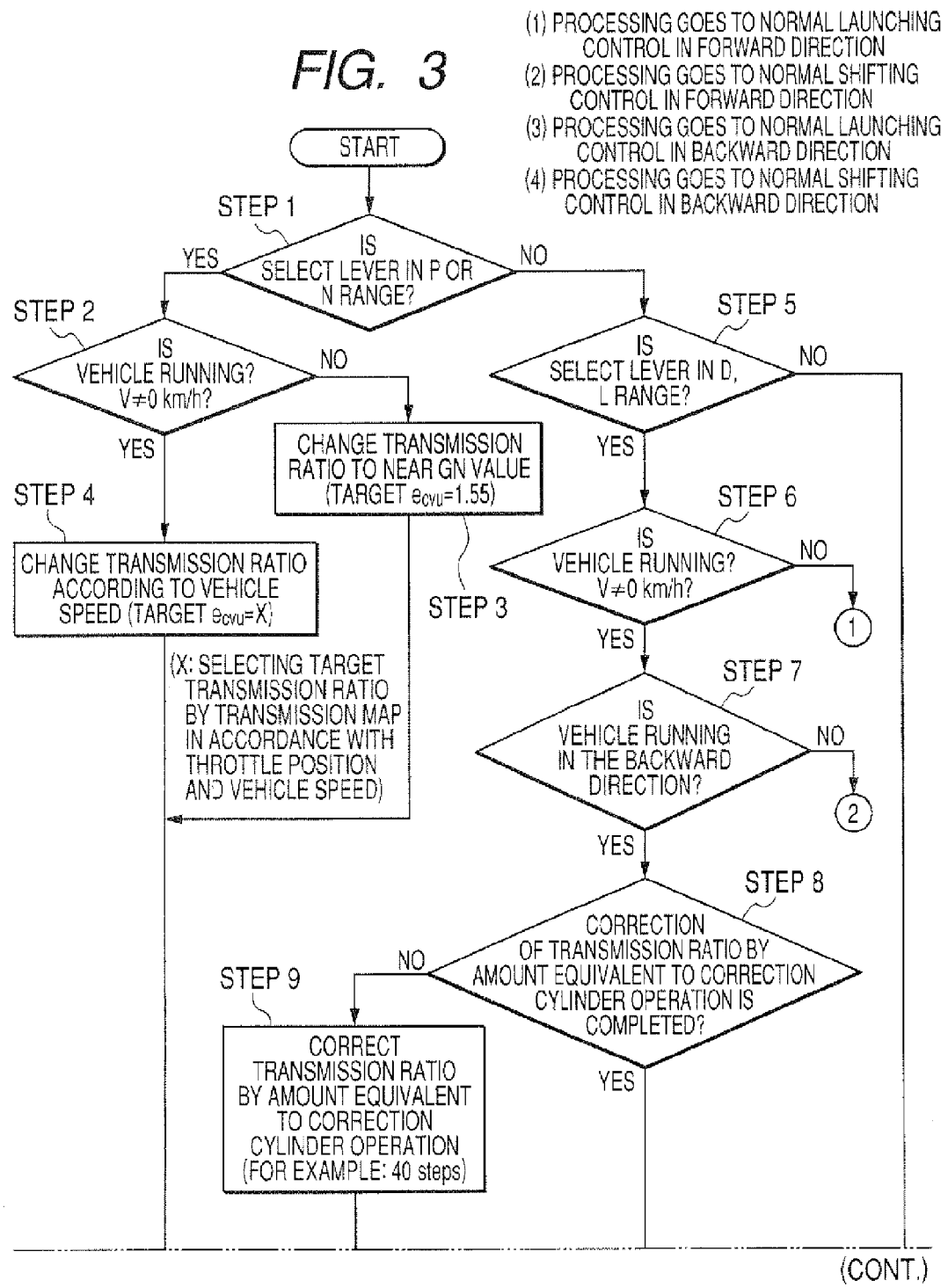

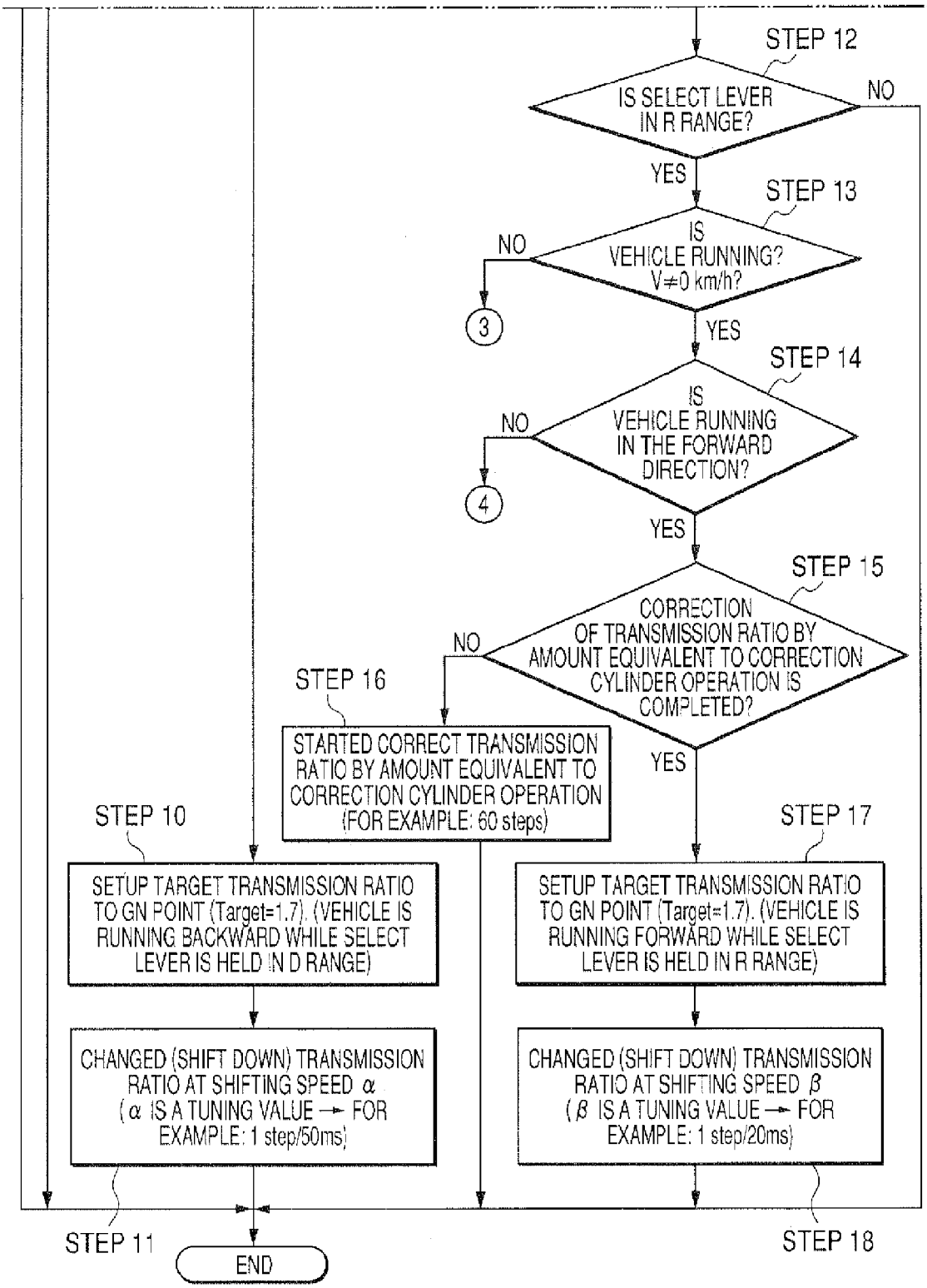

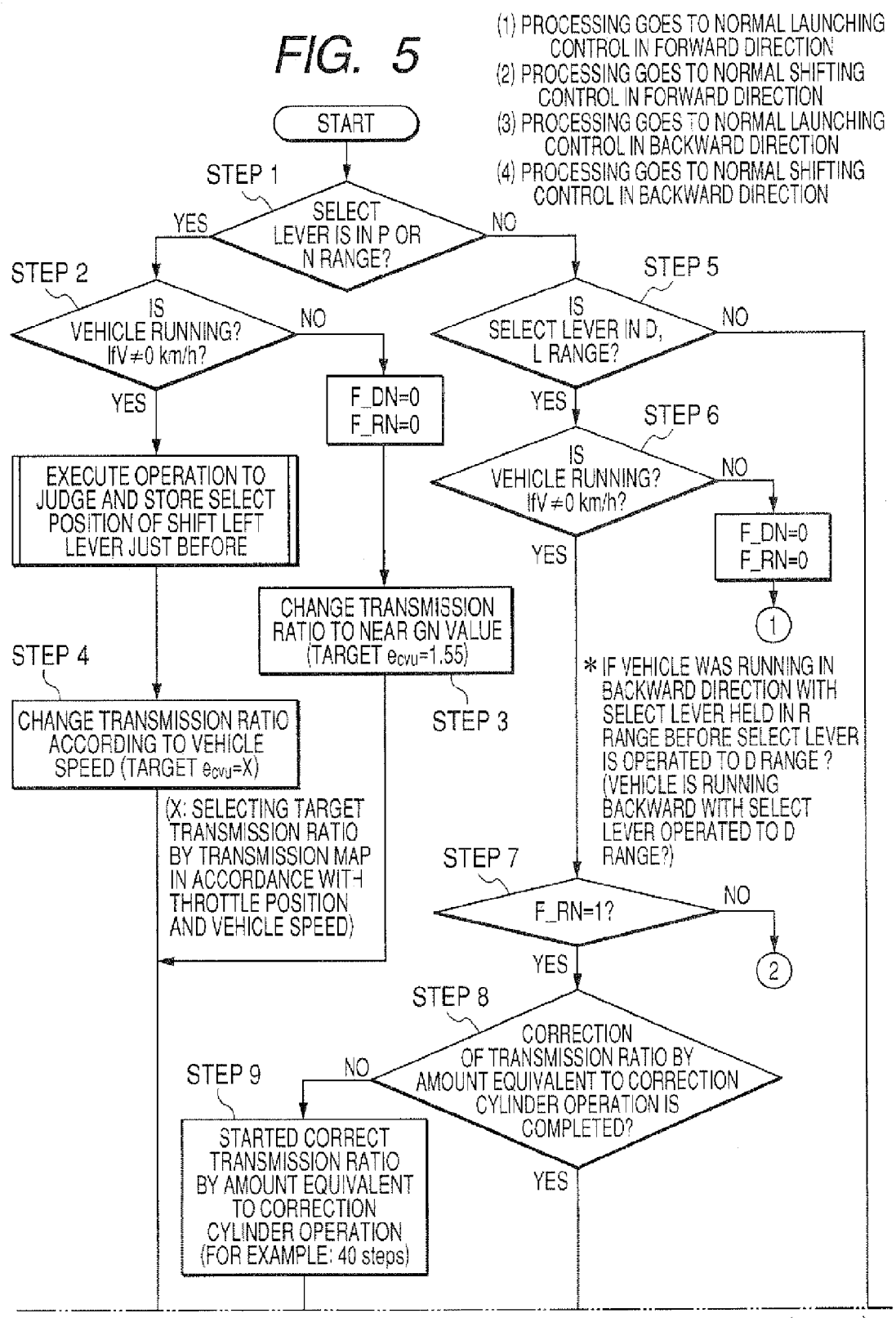

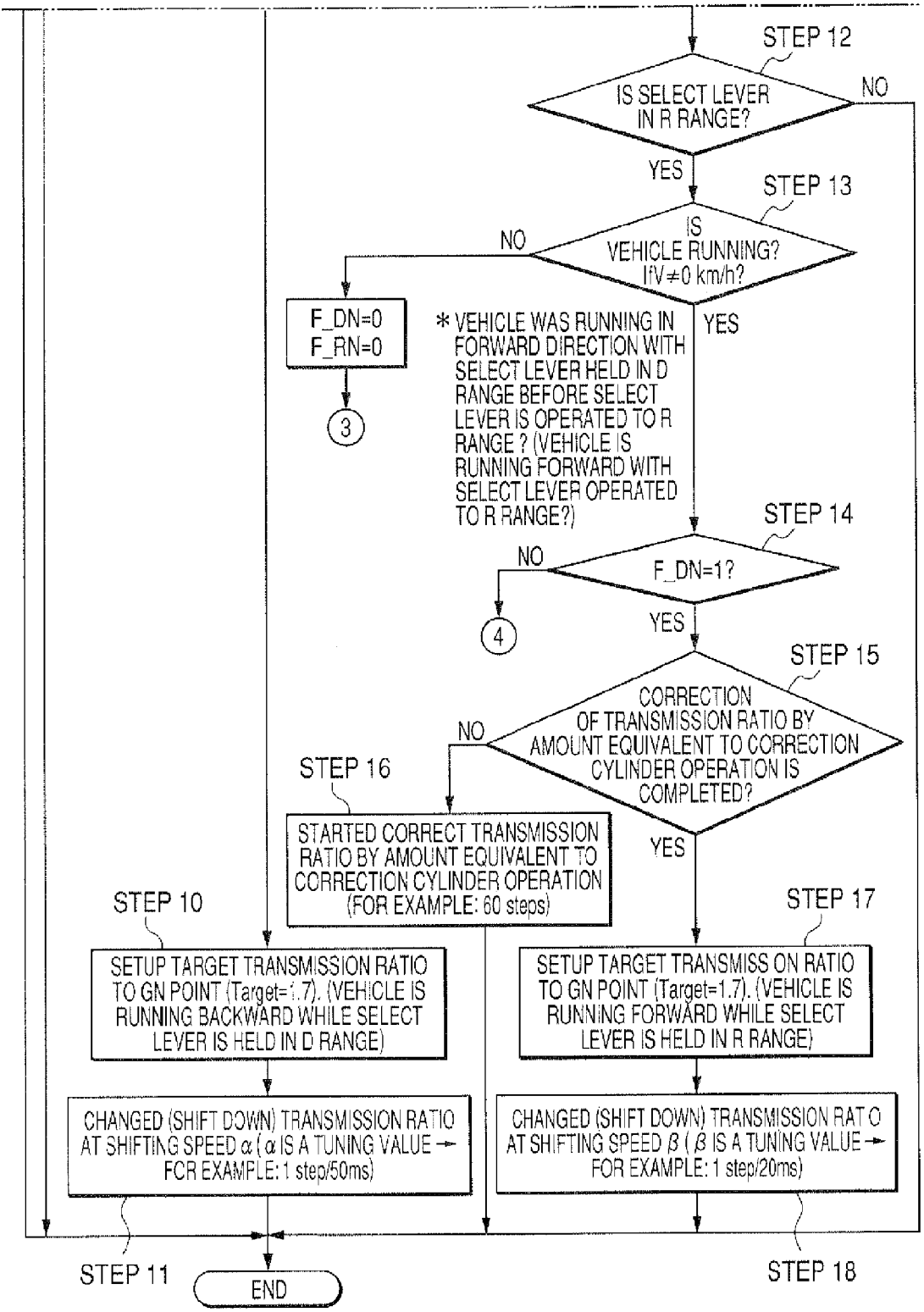

TRANSMISSION CONTROL DEVICE FOR CONTINUOUSLY VARIABLE TRANSMISSION APPARATUS FOR VEHICLES

BACKGROUND OF THE INVENTION

1. Field of the Invention

The present invention relates to an improved transmission control device for controlling the transmission ratio of a continuously variable transmission apparatus used as an automatic transmission for a vehicle (mainly a car).

Specifically, when, while a vehicle is running, a select lever is operated to a select position in the reverse direction to the running direction of the vehicle whether such select lever operation is executed by the wrong operation of a driver or an intentional operation, the present control unit can prevent the sudden change of the vehicle behavior (for example, the sudden speed reduction, the lock of a tire, and engine failure) and the damage of the vehicle or continuously variable transmission (for example, the breakage of a propeller shaft, the breakage of the interior parts of the continuously variable transmission, the burst of a clutch), can decelerate and stop the vehicle safely and quickly, and, further, as the need arises, allows the vehicle to run according to the position where the select lever is operated. And, by realizing such transmission control, the foolproof property and failsafe property of the transmission can be secured.

2. Description of Related Art

As an automatic transmission (AT) for a vehicle, conventionally, there is widely used a stepwise variable transmission apparatus including a gear type transmission mechanism having plurality of driving modes (for example, 4 to 6 forward running gears, and 1 or 2 backward running gears). In this type of stepwise variable transmission apparatus, the transmission ratio cannot adjust continuously. That is, the transmission ratio of the stepwise variable transmission apparatus can be only stepwisely changed.

As such geared variable transmission, there are conventionally known a transmission apparatus which is composed of a torque converter and a planetary gear mechanism (an ordinary AT), and an automatic manual transmission (AMT) not only capable of execution of the transmission operation (shift-down and shift-up operation) of a step-type (manual) transmission but also capable of connecting and disconnecting a clutch using an oil pressure type or electrically-operated actuator to be controlled by a control unit.

These apparatus are disclosed in, for example:

(1) Separate Volume "Best Car" Red Badge Series 245/Book for Easy Understanding of Latest Mechanisms of Vehicles, published on Dec. 20, 2000 by Sansuisha Co. Ltd/Kodansha Co. Ltd, p. 94-95; and (2) Aisin Seiki—Products/Enterprise "Drive Train Relation", [online], Aisin Seiki Co., Ltd. [Retrieved on Mar. 30, 2006], Internet <URL:http://www.aisin.co.jp/product/auto/drive/index.html>

Also, a continuously variable transmission (CVT) such as a belt-type continuously variable transmission and a toroidal continuously variable transmission are becoming widely used. For example, in Japanese Patent Unexamined Publications JP-A-2004-245326, JP-A-2004-225888 and JP-A-2005-291486, there is disclosed a continuously variable transmission in which a toroidal continuously variable transmission and a gear-type differential mechanism (a planetary-gear transmission) are combined together in such a manner that the power transmission path can be freely switched by a clutch device. In a vehicle, into which such continuously variable transmission or the above-mentioned stepwise variable transmission is incorporated, according to the operation of an accelerator pedal (an opening degree of the accelerator pedal) or a running state of at that time of the vehicle obtained from the vehicle running speed (vehicle speed), not only there is carried out transmission control for adjusting the vehicle to the optimum transmission gear or transmission ratio (a target transmission gear, a target transmission ratio) but also there are executed a torque converter lock-up clutch control and a necessary clutch connecting or disconnecting control.

By the way, when driving the vehicle with the above-mentioned automatic transmission incorporated therein, because of the wrong operation of the driver or because of intentional operation of the driver, a select lever can be sometime operated to a select position in the reverse direction to the running direction of the vehicle. Specifically, in a state where the vehicle is running forward with the select position of the select lever set at the forward running position (for example, in the D or L range), according to cases, the select lever can be operated to the backward running position (for example, to R range). Also, reversely to this, while the vehicle is running backward with the select position of the select lever set at the backward running position, the select lever may be operated to the forward running position. In such case, when the transmission is adjusted to a transmission gear or a transmission ratio corresponding to the position (operation position) where the select lever is operated, and also a clutch corresponding to this operation position is connected, there is a possibility that the vehicle behavior can be changed suddenly (for example, the vehicle can be decelerated suddenly, a tire can be locked, and an engine stall can occur) and, what is worse, the vehicle and the transmission apparatus can be damaged (for example, a propeller shaft can be broken, the interior parts of the transmission can be broken, and the clutch can burst).

Of the above-mentioned inconveniences, for example, in order to prevent the inconvenience caused by the wrong operation of the driver, the select lever is structured in the following manners:

when the select lever is operated or switched from the D or L range through N range to R range, or, inversely to this, when the select lever is operated from R range through N range to the D or L range, the select lever cannot be operated linearly (with one action); or a key-type (crank-type) shift pattern (the operation path of a select lever) is employed, or there is provided a mechanical switch separately and the select lever cannot be operated unless the select lever and switch are operated simultaneously, thereby preventing the wrong operation of the driver.

However, for example, when putting a vehicle into the garage, there is a possibility that the select lever can be operated in a state where the vehicle does not stop completely, for example, the select lever can be operated in such a manner of D range->N range->R range during the forward running of the vehicle, or in such a manner of R range->N range->D range during the backward running of the vehicle. In such case, if the vehicle is running at a low speed (for example, a speed of 5~10 km/h or lower), it is believed that the above-mentioned sudden vehicle behavior or vehicle damage are hard to occur. For this reason, during such low speed running, even when the select lever is operated to a select position in the reverse direction to the vehicle running direction, the transmission corresponding to the select lever position operated position (operation position) is permitted, and a clutch corresponding to the operation position is connected. However, depending on the road conditions (for example, icy roads or slopes), there is a possibility more or less that the above-mentioned sudden vehicle behavior change or vehicle damage can occur.

On the other hand, for the intermediate or high speed running (for example, the running at a speed of 10 km/h or higher) of the vehicle, in order to prevent the above-mentioned sudden change of vehicle behavior or vehicle damage, there are taken the following measures:

even if the select lever is operated form N range to a select position in the reverse direction to the running direction, for example, when the vehicle is running at a preset speed or higher, transmission corresponding to the selected position is prohibited; or, even if such transmission is executed, a clutch is not connected until the vehicle speed goes to a given vehicle speed or less.

However, there is a possibility that, in order to avoid some danger, the driver intentionally operates the select lever to a select position in the reverse direction to the running direction to decrease the speed of the vehicle or stop the vehicle while the driver dares to ignore the possible damage of the vehicle. For example, during the vehicle running along the downward slope, as the result of excessive use of braking, a brake pad and a brake disk are heated to give rise to a so called fade phenomenon that the performance of the brake is worsened (the friction force of the brake is lowered); or, the excessive generation of heat of the brake pad and brake disk causes a so called vapor lock phenomenon that air bubbles are produced in brake liquid and the brakes are thereby caused to fail.

That is, when the above-mentioned phenomenon is occurring, there is a possibility that the driver can intentionally operate the select lever to a select position in the reverse direction to the vehicle running direction. In such case, as described above, if the transmission is left prohibited or the clutch remains disconnected, unfavorably, the driver cannot decelerate and stop the vehicle.

In order to prevent such inconvenience, in the case of an automatic transmission (AMT) capable of connecting and disconnecting control of a clutch (clutch pressure control), when the select lever is operated to a select position in the reverse direction to the vehicle running direction, the automatic transmission may be adjusted to a transmission gear or a transmission ratio corresponding to the thus operated position and the clutch may be half-clutch controlled, whereby the vehicle can be gradually decelerated and finally the clutch can be engaged completely to thereby run the vehicle in such a manner as corresponds to the thus operated select lever position (power can be transmitted to the vehicle).

However, in this case, in the clutch and transmission, for example, during the forward running of the vehicle, a member rotating in a direction corresponding to the vehicle forward direction and a member rotating in a direction corresponding to the vehicle backward direction must be connected with each other. For this reason, there is a possibility that engaging members constituting the clutch can rub against each other and can be thereby worn away heavily, and also that an overload applied to the synchromesh mechanism of the transmission can cause seizure. Anyhow, in the conventional automatic variable transmission, specifically, in the stepwise variable transmission, when the above-mentioned select lever is operated to a select position in the reverse direction to the vehicle running direction, it is believed difficult that the vehicle can be switched to a running state corresponding to the selected position safely and quickly without applying a great burden to the transmission, clutch and the like.

SUMMARY OF THE INVENTION

In view of the above-mentioned conventional circumstances, it is an object of the invention to realize a transmission control device for a continuously variable transmission for a vehicle which, while the vehicle is running, a select lever is operated to a select position in the reverse direction to the vehicle running direction, regardless of such operation of the select lever being intentional or not, and also can prevent the sudden changes of the vehicle behavior (for example, the sudden speed reduction, the locking of a tire, and the stall of the engine) and the damage of the vehicle and the continuously variable transmission (for example, the breakage of a propeller shaft, the breakage of the interior parts of the transmission, and the burst of the clutch), can decelerate and stop the vehicle safely and quickly, and further, as the need arises, allows the vehicle to run in such a manner as corresponds to the operated position of the select lever.

According to a first aspect of the invention, there is provided a transmission control device for continuously variable transmission apparatus, comprising:

a continuously variable transmission comprising:
  a toroidal continuously variable transmission;
  a differential mechanism having plurality of gears; and
  a clutch which switches power transmitting path among the toroidal continuously variable transmission and differential mechanism; and
a control unit which adjusts a speed ratio of the continuously variable transmission, wherein
a rotation state of an output shaft is capable of switching between a forward rotation state and a reverse rotation state via a stopping state, while continuously rotating an input shaft in one-way direction, by changing a relative speed of the gears of the differential mechanism based on an adjustment of a transmission ratio of the toroidal continuously variable transmission, and
the control unit performs:
  obtaining a target speed ratio of the continuously variable transmission based on a running state of a vehicle which is obtained at least a running speed of the vehicle and an throttle position, and adjusting the speed ratio to the thus obtained target speed ratio; and
  when vehicle is running and a select lever is operated to a select position which runs the vehicle in a reverse direction relative to a vehicle running direction, changing the speed ratio from a value corresponding to a running state to zero which makes the vehicle stop along with a predetermined condition, while maintaining an engagement state of the clutch.

According to a second aspect of the invention, as set forth in the first aspect of the invention, it is preferable that after adjusting the speed ratio to zero, the control unit adjusts the speed ratio from zero to a value corresponding to the select position of the select lever.

According to a third aspect of the invention, as set forth in the first aspect of the invention, it is preferable that when the vehicle runs forward while the select lever is in a forward position, and then the select lever is operated to a backward position, the control unit adjusts the speed ratio from a value corresponding to the forward position of the select lever to zero, and then adjusts the speed ratio from zero to a value corresponding to a backward position of the select lever.

According to a fourth aspect of the invention, as set forth in the first aspect of the invention, it is preferable that when the vehicle runs backward while the select lever is in a backward position, and then the select lever is operated to a forward position, the control unit adjusts the speed ratio from a value corresponding to the backward position of the select lever to zero, and then adjusts the speed ratio from zero to a value corresponding to a forward position of the select lever.

According to a fifth aspect of the invention, as set forth in the first aspect of the invention, it is preferable that the clutch comprises:

a low speed clutch which is engaged when achieving a low speed mode that makes a deceleration ratio large, and which is disengaged when achieving a high speed mode that makes the deceleration ratio small; and a high speed clutch which is engaged when achieving the high speed mode, and which is disengaged when achieving the low speed mode.

According to a sixth aspect of the invention, as set forth in the first aspect of the invention, it is preferable that the toroidal continuously variable transmission comprises:

a pair of disks supported so as to be coaxially and freely rotate each other;

plurality of power roller interposed and held between the disks;

plurality of support member which supports respective power rollers rotatably; and a hydraulic actuator which displacing the respective support members so as to change a transmission ratio between the disks.

In the above-mentioned transmission control device for a continuously variable transmission apparatus according to the invention, even when the select lever is operated to a select position in the reverse direction to the running direction of the vehicle, the vehicle can be decelerated and stopped safely and quickly, while preventing not only the sudden changes of the vehicle behavior (for example, the sudden speed reduction, the locking of a tire, and the stall of the engine) but also the damage of the vehicle and transmission apparatus (for example, the breakage of a propeller shaft, the breakage of the interior parts of the transmission apparatus, and the burst of the clutch).

That is, in the continuously variable transmission apparatus which is controlled by the transmission control device according to the invention, in a state where the given clutch device is connected, by adjusting the transmission ratio, the output shaft of the transmission apparatus can be stopped while the input shaft thereof is left rotating in one direction by a drive source. Also, while the given clutch device is left connected (for example, without switching the connected and disconnected states of a forward running clutch and a backward running clutch), based on the adjustment of the transmission ratio of the toroidal continuously variable transmission, the output shaft can be rotated from a stopping state to either of positively or reversely rotating directions (that is, it can be rotated in either of directions respectively corresponding to the forward and backward running operations of the vehicle).

Thanks to this, when the select lever is operated to a select position in the reverse direction to the current running direction, by adjusting the transmission ratio from a value corresponding to the current vehicle running state to a geared neutral point (GN value: a value according to which the rotation of the output shaft is caused to stop while the input shaft is left rotating in one direction by a drive source) while the clutch device is connected, the vehicle can be decelerated and stopped based on an engine brake force. In this case, by adjusting the transmission ratio of the toroidal continuously variable transmission continuously and quickly as far as the above-mentioned sudden behavior change and damage, for example, the above-mentioned sudden change and damage of the vehicle due to the wrong operation by a driver can be prevented. Also, when the driver operates the select lever intentionally in a state where the braking force of the brake device cannot be obtained, the vehicle can be decelerated and stopped safely and quickly due to the engine brake force. Further, as the need arises, by adjusting the speed ratio of the continuously variable transmission apparatus from a stopping state according to the adjustment of the transmission ratio of the toroidal continuously variable transmission to a value corresponding to the position to which the select lever is operated, after the vehicle is stopped, the vehicle can also be made to run in a direction corresponding to the above-operated select lever position. Thanks to the permission of such running of the vehicle, when the driver intentionally operates the select lever to a select position in the reverse direction to the running direction, for example, for putting the vehicle into the garage, the driver can drive the vehicle as the driver wants without causing the above-mentioned sudden behavior changes and damages of the vehicle.

BRIEF DESCRIPTION OF THE DRAWINGS

FIG. 3 is a flow chart of the operation of the transmission control that provides the characteristic of the first embodiment of the mode for enforcing the invention;

FIG. 5 is a flow chart of the operation of the transmission control that provides the characteristic of a second embodiment of the mode for enforcing the invention;

DETAILED DESCRIPTION OF EXEMPLARY EMBODIMENTS OF THE INVENTION

Embodiments

First Embodiment

Figure 1:
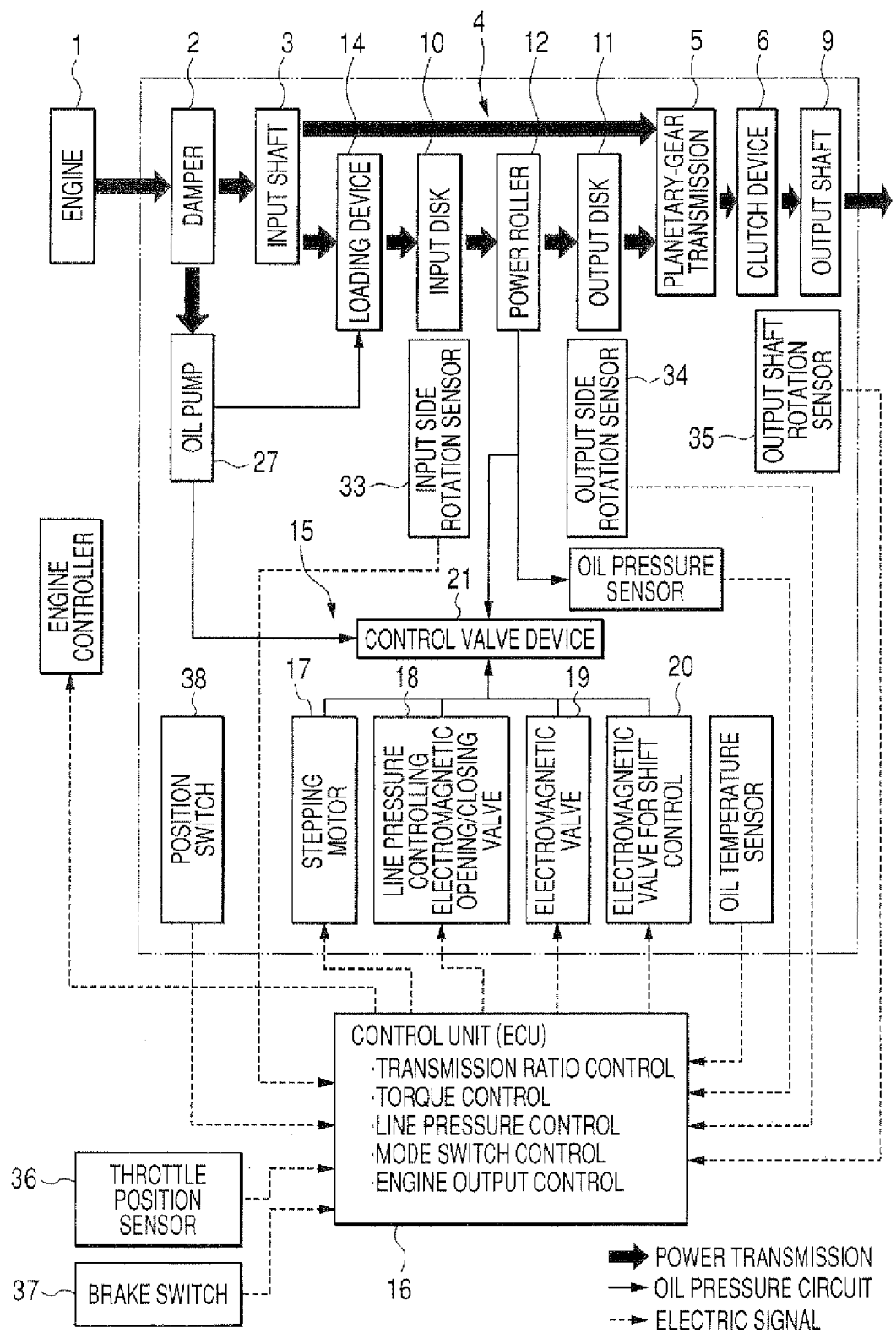
FIG. 1 is a block diagram of a first embodiment of a continuously variable transmission apparatus to which a transmission control device according to the invention is applied.
Figure 2:
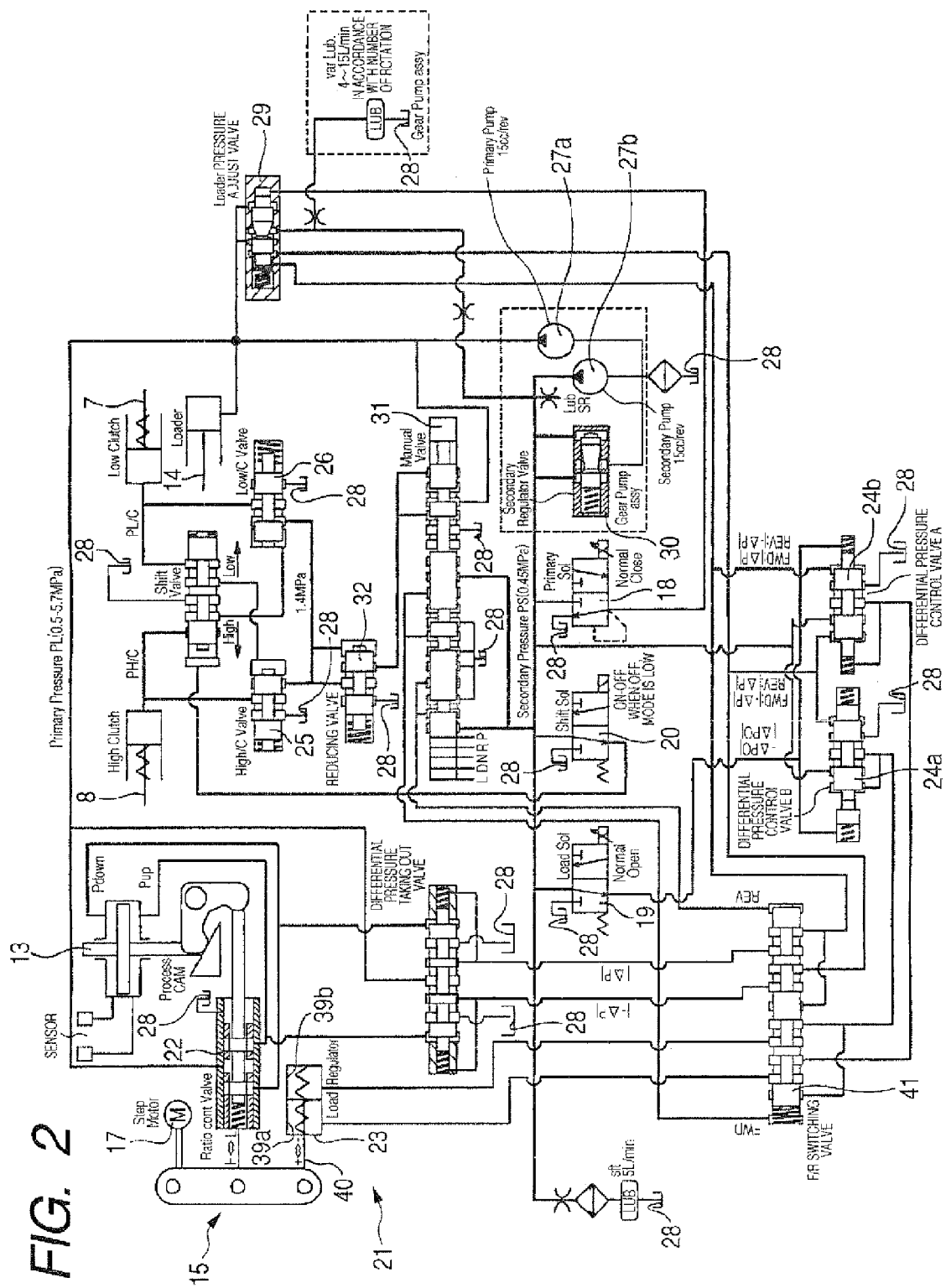
FIG. 2 is a circuit diagram of an oil pressure circuit for transmission control.

FIGS. 1 to 4 show a first embodiment of the best mode for carrying out the invention. Of these figures, FIG. 1 is a block diagram of a continuously variable transmission apparatus in which a toroidal continuously variable transmission 4 and a gear-type differential mechanism (a planetary-gear transmission 5) are combined together to thereby realize a so called infinite transmission ratio (a geared neutral state or a speed ratio 0 state) which can stop an output shaft 9 while an input shaft 3 is left rotating, as described in JP-A-2004-245326. FIG. 2 is a circuit diagram of an oil pressure circuit which is used to control the continuously variable transmission apparatus. In the present embodiment, when a select lever is operated to a select position in the reverse direction to the current vehicle running direction, the speed ratio of the continuously variable transmission apparatus can be varied along a preset condition.

The output of an engine 1 is input through a damper 2 to an input shaft 3. The power transmitted to the input shaft 3 is transmitted directly or through a toroidal continuously variable transmission 4 to a planetary-gear transmission 5 which is a gear type differential mechanism. Differential components of the composing members of the planetary-gear transmission 5 are taken out to an output shaft 9 through a clutch device 6 (that is, low speed and high speed clutches 7 and 8 respectively shown in FIG. 2). Also, the toroidal continuously variable transmission 4 includes input and output disks 10 and 11, two or more power rollers 12, two or more trunnions (not shown) respectively functioning as support members, an actuator 13 (FIG. 2), a loading device 14, and a transmission ratio control unit 15. Of these parts, the input and output disks 10 and 11 are arranged such that they are concentric with each other and can be rotated with respect to each other.

The respective power rollers 12 are held by and between the inside surfaces of the mutually facing input and output disks 10 and 11 and are used to transmit power (torque) between these input and output disks 10 and 11. The respective trunnions support their associated power rollers 12 rotatably. The actuator 13 is of an hydraulic (oil) pressure type and is used to shift the trunnions supporting their respective power rollers 12 in the axial directions of pivot shafts provided on the both end portions of the respective trunnions to thereby change a transmission ratio between the input and output disks 10 and 11. The loading device 14 is of hydraulic (oil) pressure type and is used to press the input and output disks 10 and 11 in a direction where they approach each other. The transmission ratio control unit 15 controls the shifting direction and shifting amount of the actuator 13 in order that the transmission ratio between the input and output disks 10 and 11 can be adjusted to a desired value.

In the present embodiment, the transmission ratio control unit 15 includes a control unit 16, a stepping motor 17, a electromagnetic valve for line pressure control, an electromagnetic valve 19, a electromagnetic valve for shift control 20 which can be respectively switched according to control signals supplied from the control unit 16, and a control valve device 21 the operation states of which can be switched by these respective parts 17~20. By the way, the control valve device 21 is a device in which a transmission ratio control valve 22, a correction cylinder 23, a correcting control valves 24a and 24b, and switch valves 25 and 26 (FIG. 2) respectively for high speed and low speed clutches are combined together. Of these parts, the transmission ratio control valve 22 is used to control the supply and drainage of the oil to and from the actuator 13. The correction cylinder 23 is used to adjust the switching states of the transmission ratio control valve so that the transmission ratio of the toroidal continuously variable transmission 4 can be corrected according to the torque (passing torque) passing through the toroidal continuously variable transmission 4 and the select position of the select lever operated by the driver. And, the correcting control valves 24a and 24b are used to control the supply and drainage of the oil to and from the correction cylinder 23 and can be switched correspondingly to the switching of the electromagnetic valve 19. Further, the high speed clutch and low speed clutch switch valves 25 and 26 are respectively used to switch the introduction states of the pressurized oil to the high speed clutch and low speed clutch switch valves 25 and 26.

The pressurized oil, which is discharged from oil pumps 27 (in FIG. 2, 27a and 27b) driven by the power taken out from the damper 2, is fed into the control valve device 21 and the loading device 14. That is, the pressurized oil, which has been sucked from oil storing portions 28 (FIG. 2) and discharged by the oil pumps 27a and 27b, is adjusted to a given pressure by a pressing force adjust valve 29 and a low pressure adjust valve 30 (FIG. 2). Of these two adjust valves, the pressing force adjust valve 29 is structured such that the valve opening pressure thereof can be adjusted based not only on an oil pressure corresponding to a difference (a differential pressure) between oil pressures respectively existing in a pair of oil pressure chambers disposed in the actuator 13 with a piston between them but also on the introduction of the oil pressure according to the opening and closing of the electromagnetic valve for line pressure control 18 which can be controlled by an instruction issued from the control unit 16. Based on such adjustment of the valve opening pressure, pressing force to be generated by the loading device 14 can be regulated to the optimum value corresponding to the driving states of the vehicle.

The pressurized oil adjusted by the pressing force adjust valve 29 is supplied not only into the actuator 13 through the transmission ratio control valve 22 but also into the oil pressure chamber of the low speed clutch 7 or high speed clutch 8 through a manual oil pressure switch valve 31, a reducing valve 32, and the above-mentioned high speed clutch and low speed clutch switch valves 25 and 26. Of the low speed clutch 7 and high speed clutch 8, the low speed clutch 7 is connected when realizing a low speed mode for increasing a reduction ratio {including an infinite transmission ratio (geared neutral state=GN state)} and is disconnected when realizing a high speed mode for decreasing the reduction ratio. On the other hand, the high speed clutch 8 is disconnected when realizing the low speed mode and is connected when realizing the high speed mode. The supply and drainage to and from the low speed and high speed clutches 7 and 8 can be switched according to the switching of the electromagnetic valve for shift control 20.

The low speed mode where the low speed clutch 7 is connected, as the transmission ratio of the toroidal continuously variable transmission 4 is decreased from the value (GN value) capable of realizing the GN state, the speed ratio of the continuously variable transmission apparatus can be increased from the stopping state (the state in which the speed ratio is 0) in the forward direction accordingly. Similarly, as the transmission ratio is increased from GN value, the speed ratio can be increased in the backward direction accordingly. On the other hand, in the high speed mode in which the high speed clutch 8 is connected, as the transmission ratio of the toroidal continuously variable transmission 4 is increased, the speed ratio of the continuously variable transmission apparatus can be increased (for example, see FIG. 9 of the JP-A-2004-245326).

According to the present embodiment, to the control unit 16, there are input the detect signals of input side and output side rotation sensors 33 and 34, the detect signal of an output shaft rotation sensor 35, the detect signal of a throttle position sensor 36, the detect signal of a brake switch 37 and the detect signal of a position switch 38. Of these parts, the input side rotation sensor 33 measures the rotation speed of the input disk 10, the output side rotation sensor 34 measures the rotation speed of the output disk 11, and the output shaft rotation sensor 35 measures the rotation speed of the output shaft 9, respectively. Based on the rotation speeds respectively measured by these sensors 33, 34 and 35, the transmission ratio (speed ratio) of the toroidal continuously variable transmission 4 as well as the running speed (vehicle speed) of the vehicle can be calculated. The throttle position sensor 36 is used to detect the opening degree of an accelerator pedal (throttle position). The brake switch 37 detects that a service brake (a normally used brake, for example, a foot brake) is operated (a brake pedal is pressed), and issues a signal for expressing the detection result. Also, the position switch 38 is used to issue a signal for expressing the select position of a select lever (operation lever, select lever) which is provided in a driver's seat.

The detect signals of the respective sensors 33, 34, 35 and 36 as well as the switches 37 and 38 are input to the control unit 16. The control unit 15 has a function that based on the running state of the vehicle obtained from not only the running speed of the vehicle (vehicle speed) detected from the output signal of the output shaft rotation sensor 35 but also the throttle position detected from the output signal of the throttle position sensor 36, the target speed ratio (the optimum speed ratio corresponding to the current vehicle running state) of the continuously variable transmission apparatus is obtained, and the speed ratio of the continuously variable transmission apparatus is adjusted to the thus obtained target speed ratio.

When adjusting the speed ratio of the continuously variable transmission apparatus to the thus obtained target speed ratio in this manner, it is also possible that the target transmission ratio of the toroidal continuously variable transmission 4 corresponding to the target speed ratio of the continuously variable transmission apparatus is obtained, and the thus obtained transmission ratio of the toroidal continuously variable transmission 4 is adjusted to the thus obtained target transmission ratio.

Anyhow, the correlation between the vehicle speeds, throttle positions (the state amounts expressing the vehicle running state) and the target speed ratio (target transmission ratio) may be previously stored in the memory of the control unit 16 in the form of a map or expressions, and the speed ratio may be adjusted to the target speed ratio (target transmission ratio) that corresponds to the current vehicle running state amounts (vehicle speed, throttle position and the like). Also, the adjustment of the transmission ratio of the toroidal continuously variable transmission 4 and thus the speed ratio of the whole of the continuously variable transmission apparatus can be carried out not only by switching the supply and drainage of the oil to and from the actuator 13 by driving the stepping motor 17 according to a control signal from the control unit 16, but also by switching the connected and disconnected states of the low speed and high speed clutches 7 and 8 (high speed and low speed modes) based on the switching of the electromagnetic valve for shift control 20.

According to the present embodiment, in order that, when starting the vehicle, the optimum drive force (creep force) corresponding to the vehicle starting direction can be outputted from the output shaft 9 (a driving wheel driven by the output shaft 9), the transmission ratio ($e_{cvu}$) of the toroidal continuously variable transmission 4 is corrected.

Figure 4:
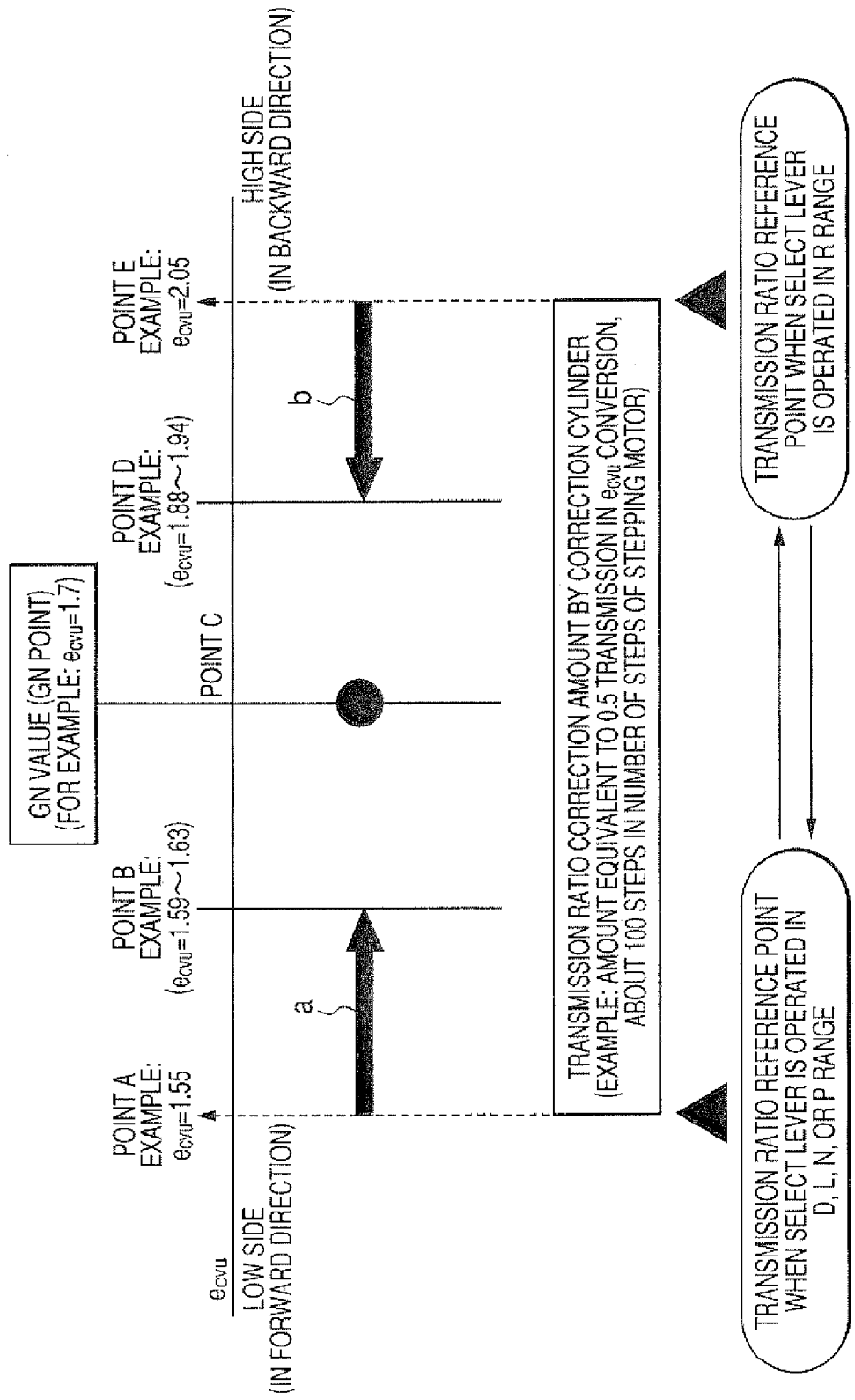
FIG. 4 is a typical view to explain transmission ratio control which is carried out when starting a vehicle.

Now, description will be given below of the correction control of the transmission ratio of the toroidal continuously variable transmission 4 with reference to FIG. 4. According to the present embodiment, by driving the correction cylinder 23 and stepping motor 17 (see FIG. 2 or the like) based on the operation of the select lever, the transmission ratio ($e_{cvu}$) of the toroidal continuously variable transmission 4 is corrected (it is shifted from GN value) and thus the drive force (creep force) to be outputted from the output shaft 9 of the continuously variable transmission apparatus is adjusted to the optimum value that corresponds to the vehicle running direction. Specifically, when the select position of the select lever is a non-running position (in the P or N range), pressure oil is introduced into a pressure chamber 39a (a chamber existing left in FIG. 2), which is one of a pair of oil pressure chambers 39a and 39b constituting the correction cylinder 23, and at the same time, the pressurized oil of the other chamber 39b (for example, a chamber existing right in FIG. 2) is drained.

The select position of the select lever is judged by the control unit 16 based on the detect signal of the position switch 38. Also, the supply and drainage of the pressurized oil to and from the correction cylinder 23 are carried out by switching a forward/backward running switch valve 41 based on the switching of the manual oil pressure switch valve 31 caused due to the operation of the select lever. Specifically, when the select lever (and thus the manual oil pressure switch valve 31) is switched over to P, N, D, or L range (a non-running position, or a forward running position), the pressurized oil is introduced into one oil pressure chamber (left in FIG. 2, on the FWD side) of the forward/backward running switch valve 41, the spool of the forward/backward running switch valve 41 is shifted to the other oil pressure chamber (existing right in FIG. 2) in response to the introduction of the pressurized oil, and the pressurized oil (PS pressure based on the driving of the pump 27b) is thereby introduced into one oil pressure chamber 39a of the correction cylinder 23. In a state where the rod 40 of the correction cylinder 23 is shifted (driven) to the right side of FIG. 2 based on such introduction of the pressurized oil, the transmission ratio of the toroidal continuously variable transmission 4 is adjusted to a point A (for example, a speed increasing ratio of 1.55) based on the driving of the stepping motor 17. The point A is defined as a value in which, when the low speed clutch 7 is connected and the pressing of the brake is removed, a drive force capable of starting the vehicle in the forward direction and also capable of running the vehicle at a low speed can be positively output from the output shaft 9 (that is, a value which allows the output of a rather strong creep force in the forward direction). In this manner, in a state where the select lever is held at the non-running position (in the P or N range), in other words, in a state before the select lever is operated to the forward running position (in L or D range), the transmission ratio of the toroidal continuously variable transmission 4 is adjusted to the value capable of outputting the forward direction drive force from the output shaft 9. The reason for this is that, generally, the frequency of the forward running of the vehicle is high. While the select lever is held at the non-running position (in P or N range), the low speed and high speed clutches 7 and 8 are respectively disconnected.

Also, when the select lever is operated to the forward running position (in L or D range) from the above-mentioned P or N range where the transmission ratio of the toroidal continuously variable transmission 4 is adjusted to the point A in the above-mentioned manner (while the low speed clutch 7 remains connected), based on the driving of the stepping motor 17, the transmission ratio of the toroidal continuously variable transmission 4 is adjusted from the point A to a point B (for example, a speed increasing ratio of 1.59~1.63) as shown by an arrow mark a. The point B provides a value (a value capable of outputting the optimum creep force in the forward direction) which allows the output shaft 9 to output the optimum drive force, while the optimum drive force is determined according to such a state amount such as the temperature of lubricating oil (traction oil) that can have an influence on the drive force (creep force) to be outputted. In a state where the transmission ratio is adjusted to the point B in this manner, when the pressing of the brake is removed, the vehicle can be started smoothly in the forward direction. Such adjustment of the transmission ratio from the point A to the point B is carried out only based on the driving of the stepping motor 17 without shifting (driving) the rod 40 of the correction cylinder 23 (while the rod 40 is left held in the same state as in P or N range). In other words, the correction cylinder 23 is held in the same operation state in P, N, D, or L range (a state where the rod 40 is shifted to the right in FIG. 2).

On the other hand, when the select lever is operated from N range to a backward running position (R range), (while the low speed clutch 7 is left connected), not only pressure oil is introduced into, of the pair of oil pressure chambers 39a and 39b constituting the correction cylinder 23, the other oil pressure chamber 39b (for example, a chamber existing right in FIG. 2), but also the pressurized oil of one oil pressure chamber 39a (for example, a chamber existing left in FIG. 2) is discharged therefrom. Specifically, when the select lever (and thus the manual oil pressure switch valve 31) is switched over to R range (the backward running position), the pressurized oil is introduced into the other oil pressure chamber (which exists right in FIG. 2 on the REV side) of the forward/backward running switch valve 41, the spool of the forward/backward running switch valve is shifted to one direction (to the left in FIG. 2) based on the introduction of the pressurized oil, whereby the pressurized oil (the PS pressure based on the driving of the pump 27b) is introduced into the other oil pressure chamber 39b of the correction cylinder 23. Based on such introduction of the pressurized oil, the rod 40 of the correction cylinder 23 is shifted to the left in FIG. 2 and the transmission ratio of the toroidal continuously variable transmission 4 is adjusted from the point A to a point E (for example, a speed increasing ratio of 2.05). The point E provides a value (a value capable of outputting a rather strong creep force in the backward direction) which, when not only the low speed clutch 7 is connected but also the pressing of the brake is removed, allows the output shaft 9 to positively output a drive force capable of not only starting the vehicle in the backward direction but also running the vehicle at a low speed in the backward direction. Such adjustment of the transmission ratio from the point A to the point E based on the shift of the rod 40 of the correction cylinder 23 is carried out instantaneously based on the above-mentioned oil pressure introduction.

Simultaneously with such adjustment of the transmission ratio based on the driving of the correction cylinder 23, the transmission ratio is similarly adjusted based on the driving of the stepping motor 17 by an amount equivalent to an amount from the point E to a point D (for example, a speed increasing ratio of 1.88~1.94), that is, an amount corresponding to an arrow mark b. In other words, the transmission ratio is adjusted to the point D providing a value (a value capable of outputting the optimum creep force in the backward direction) which allows the output shaft 9 to output the optimum drive force, while this optimum drive force is determined according to such a state amount such as the temperature of lubricating oil (traction oil) as can have an influence on the drive force (creep force) to be outputted. In this state, when the pressing of the brake is removed, the vehicle can be started smoothly in the backward direction. The values of the transmission ratios of the toroidal continuously variable transmission 4 to be adjusted based on the driving of the correction cylinder 23 and the stepping motor 17, that is, the points A, B, D and E respectively provide such values (which can be forcibly gear-changed to the point C) that, in a state where the brake is pressed down and the low speed clutch 7 is connected (or it is assumed that the low speed clutch 7 is connected), can be adjusted to GN value (GN point: for example, a speed increasing ratio of 1.7) based on torque shift without stopping the engine 1.

According to the present embodiment, the control unit 16 has the following function: that is, when, while the vehicle is running, a select lever provided in a driver's seat is operated to a select position in the reverse direction to the running direction, in a state where the clutch device 6 (for the high speed running, the high speed clutch 8; and, for the low speed running or backward running, the low speed clutch 7) is connected, the speed ratio of the continuously variable transmission apparatus can be changed from a value corresponding to the running state to a value 0 capable of realizing the above-mentioned stopping state along a preset condition. Together with this function, the control unit 16 also has another function which, after the speed ratio of the continuously variable transmission apparatus is changed to the value 0 capable of realizing the above-mentioned stopping state, can adjust the speed ratio to a value corresponding to the position (operation position) to which the select lever has been operated {an execute (starting) transmission control corresponding to the operation position}.

In other words, for example, when, in a state where the select lever is operated to the forward running position (in D or L range), while the vehicle is running forward, the select lever is operated to the backward running position (in R range), the speed ratio of the continuously variable transmission apparatus is changed (reduced) from a value corresponding to the current vehicle forward running to the value 0 capable of making the vehicle stop {for example, in a state where the high speed clutch 8 is connected, the transmission ratio of the toroidal continuously variable transmission 4 is changed to the speed reducing side; and, in a state where the low speed clutch 7 is connected, the transmission ratio of the toroidal continuously variable transmission 4 is similarly changed to the speed increasing side, (for example, see the above-mentioned JP-A-2004-245326)}. Next, in order to start the vehicle in the backward direction, the speed ratio of the continuously variable transmission apparatus is adjusted (increased in the backward direction) to a value corresponding to the above-mentioned backward running position (because the low speed clutch 7 is connected, the transmission ratio of the toroidal continuously variable transmission 4 is changed to the speed increasing side). Also, reversely to this, when, in a state where the select lever is operated to the forward running position, while the vehicle is running backward, the select lever is operated to the forward running position, the speed ratio of the continuously variable transmission apparatus is changed (decreased) from the value corresponding to the current backward running to the value 0 capable of realizing the stopping state (because the low speed clutch 7 is connected, the transmission ratio of the toroidal continuously variable transmission 4 is changed to the speed decreasing side). Then, in order to start the vehicle in the forward direction, the speed ratio of the continuously variable transmission apparatus is adjusted (increased to the forward direction) to a value corresponding to the above-mentioned forward running position (because the low speed clutch 7 is connected, the transmission ratio of the toroidal continuously variable transmission 4 is changed to the speed decreasing side).

Now, description will be given below of the functions owned by the control unit 16 with reference to a flow chart of FIG. 3. Operations shown in this flow chart are executed repeatedly automatically from the time when an ignition switch is turned on to the time when it is turned off.

Firstly, in a step 1, the control unit 16 checks whether the select position of the select lever is a non-running position (P or N range) or not. This check is carried out based on the detect signal of the position switch 38. When it is judged in Step 1 that the select position of the select lever is a non-running position (P or N range), the processing goes to Step 2 in which it is checked whether the vehicle is running or not.

This check is carried out according the detect signal of the output shaft rotation sensor 35, that is, from the check based on the rotation speed of the output shaft 9 as to whether the running speed (V km/h) of the vehicle is not 0 km/h (V≠0 km/h). When it is judged that the running speed is 0 km/n (the vehicle is not running), the processing goes to Step 3, in which the transmission ratio of the toroidal continuously variable transmission 4 is adjusted to the point A (1.55) shown in FIG. 4 based on the driving of the correction cylinder 23 and stepping motor 17, and the operation is ended (the processing returns to the start).

On the other hand, in the step 2, when it is judged that the running speed is not 0 km/h (the vehicle is running), the transmission ratio of the toroidal continuously variable transmission 4 is adjusted to a target transmission ratio corresponding to the vehicle running state (such as the vehicle speed and throttle position), and the operation is ended (the processing returns to the start). That is, from the judging results of the steps 1 and 2, it can be judged that the vehicle is running (drifting) in a state where the select position of the select lever is in N range, that is, the low speed and high speed clutches 7 and 8 are both disconnected. Therefore, even when the low speed and high speed clutches 7 and 8 are both disconnected, the transmission ratio of the toroidal continuously variable transmission 4 is adjusted to the target transmission ratio corresponding to the vehicle running state (not adjusted to GN value or the like); that is, thanks to this adjustment, whenever the connection of the low speed clutch 7 or high speed clutch 8 is started, the sudden changes of the vehicle behavior or the damage of the vehicle can be prevented. Such adjustment to the target transmission ratio, as described above, is carried out based on the relation (MAP, expression or the like) between the vehicle running state (vehicle speed, throttle position and the like) previously stored in the memory of the control unit 16 and the optimum transmission ratio (target transmission ratio).

On the other hand, when it is judge in the step 1 that the select position of the select lever is not the non-running position (P or N range), in Step 5, it is checked whether the select position of the select lever is a forward running position (D or L range) or not. This check is carried out based on the detect signal of the position switch 38. When it is judged in this step 5 that the select position of the select lever is the forward running position (D or L range), in the following step 6, it is checked whether the vehicle is running or not. This check is carried out similarly to the step 2. When it is judged in this step 6 that the running speed of the vehicle is 0 km/h (the vehicle is not running), the processing goes to 1-in-circle (a normal forward direction starting control is executed) and then the operation is ended (the processing goes back to the start). That is, since the select position of the select lever is the forward running position (D or L range) and the vehicle is stopping, it can be judged that the driver is going to start the vehicle. Therefore, the transmission ratio of the toroidal continuously variable transmission 4 is adjusted to the above-mentioned point B (1.59~1.63) shown in FIG. 4 based on the driving of the correction cylinder 23 and stepping motor 17, and the operation is then ended (the processing goes back to the start). In this state, for example, when the pressing of the brake is removed, the optimum creep force in the forward direction is outputted from the output shaft 9 and thus the vehicle can be started smoothly.

On the other hand, in the step 6, when it is judged that the running speed is not 0 km/h (V≠0 km/h) (the vehicle is running), the processing goes to a next step 7. In this step 7, the running direction of the vehicle is checked. More specifically, it is checked whether the vehicle is running backward or not. Such check for the vehicle running direction can be executed, for example, according to not only detect signals respectively outputted from the input side and output side rotation sensors 33 and 34 (signals which express the rotation speeds of the input and output disks 10 and 11) but also the previously obtained decelerating ratio of the planetary-gear transmission 5. Such manner of judgment is disclosed in the JP-A-2004-245326 and thus the detailed description thereof is omitted here. Besides the execution of such judgment of the running direction of the vehicle, for example, on the output shaft 9, there can be provided a member to be detected which can change the output characteristic of a detect sensor according to the rotation direction and, based on the output signal of this detect sensor, the running direction of the vehicle can be judged. This is disclosed in the and thus the detailed description thereof is omitted here.

Anyhow, in the step 7, when it is judged that the vehicle is not running backward (the vehicle is running forward), the processing goes to 2-in-circle (a normal forward running transmission control is executed), and then the operation is ended (the processing goes back to the start). That is, since the select position of the select lever is the forward running position (D, L range) and the vehicle is running forward, it can be judged that the driver is going to or continue to run the vehicle forward. Therefore, the transmission ratio of the toroidal continuously variable transmission 4 is adjusted to a target transmission ratio corresponding to the running state (vehicle speed, throttle position and the like) based on the driving of the stepping motor 17. That is, a normal forward running transmission control is executed. On the other hand, in the step 7, when it is judged that the vehicle is running backward, the processing goes to a next step 8. That is, based on the judgments of the steps 1, 5~7, although the vehicle is running backward, it can be judged that the select lever has been operated to the forward running position (D or L range) existing in the reverse direction to the vehicle running direction. Thus, in the step 8 and its following steps 9~11, there is carried out an operation to decelerate and stop the vehicle safely and quickly.

Firstly, in the step 8, since the correction cylinder 23 is driven according to the operation of the select lever, it is judged that an amount, by which the transmission ratio of the toroidal continuously variable transmission 4 is varied from a value at that time point, is corrected based on the driving of the stepping motor 17 (the transmission ratio is returned back to the current value). That is, when the select lever is operated to the select position in the reverse direction to the vehicle running direction (it is operated from R range through N range to D range), based on the operation of the select lever, the rod 40 of the correction cylinder 23, as described above, is shifted to the right from a state where it is shifted left in FIG. 2. The transmission ratio control valve 22 is switched based on this shift of the rod 40, whereby the transmission ratio of the toroidal continuously variable transmission 4 is varied from the value at that time point. In the step 8, it is checked whether an operation, in which the amount of the variation from the value at that time point of the transmission ratio based on the operation of the correction cylinder 23 is returned to the value at that time point (or to the vicinity of the value at that time point) based on the driving of the stepping motor 17, (namely, an operation to maintain the transmission ratio in the vicinity of the value at that time point), is carried out or not.

In the step 8, when it is judged that the operation to return the transmission (the correction operation) is not carried out yet, the processing goes to the step 9 in order to execute this operation. In the step 9, the stepping motor 17 is driven in a direction equivalent to the reverse direction to the direction where the transmission ratio is varied due to the correction cylinder 23, for example, by an amount corresponding to 40 steps (and then the operation is ended, that is, the processing goes back to the start). Although the variation amount of the transmission based on the operation of the correction cylinder 23 is a value which is previously set in design as a fixed value, the driving amount (the number of steps) of the stepping motor 17 used to return (correct) such variation amount is preferably adjusted according to the vehicle running state (for example, the vehicle speed and the reducing speed) as a tuning value. However, it is not always necessary to return the same amount (for example, 0.5 transmission amount, amount corresponding to 100 steps) as the transmission ratio has varied due to the correction cylinder 23. Also, the driving speed of the stepping motor 17, preferably, may be the maximum speed (for example, 1 step/1 ms) in order to complete the correction operation of the transmission ratio prior to (or at the same time of) completion of the connection the clutch device 8 (for the high speed forward running, the high speed clutch 8; and, for the low speed forward running or backward running, the low speed clutch 6) corresponding to the time vehicle running state based on the operation of the select lever.

On the other hand, in the step 8, when it is judged that, after the operation to return the transmission ratio (the correction operation) is already executed (after the operation of the step 9 is executed, the progress arrives at the step 8 again), the processing goes to a step 10. Advancing to the step 10 means that the correction of the transmission ratio based on the driving of the stepping motor 17 has been carried out and the connection of the clutch device 8 has been completed. Thus, in the step 10, the target transmission ratio of the toroidal continuously variable transmission 4 is set to GN value (the point C in FIG. 4: 1.7). This is the same operation to set the target speed ratio of the continuously variable transmission apparatus to 0. In a step 11, in order to reduce or stop the vehicle based on the engine brake force, the transmission ratio of the toroidal continuously variable transmission 4 is changed toward GN value under a given condition. For example, at the shifting speed α {simultaneously when the transmission ratio change is started, the operation is ended (the processing goes back to the start)}. This transmission ratio change is carried out based on the driving of the stepping motor 17.

The shifting speed α is previously set for such a value (for example, for the driving speed of the continuously variable transmission apparatus, 1 step/50 ms) that can reduce the speed ratio of the continuously variable transmission apparatus continuously and as quickly as possible, while this value should be selected from a group of values which are capable of preventing not only the sudden changes of the vehicle behavior (for example, the sudden speed reduction, the locking of a tire, and the stall of an engine) but also the damages of the vehicle and continuously variable transmission apparatus (for example, the breakage of a propeller shaft, the breakage of the interior parts of the continuously variable transmission apparatus, the burst of a clutch). It is also preferable that the shifting speed α may be adjusted to the optimum value (the tuning value) according to the vehicle running state (the vehicle speed, the reducing speed and the like). Anyhow, when the transmission ratio of the toroidal continuously variable transmission 4 is caused to vary toward GN value based on the thus set shifting speed α, the vehicle can be decelerated and stopped due to the engine brake force without causing the above-mentioned sudden change of the vehicle behavior and the damage of the vehicle. When the transmission ratio of the toroidal continuously variable transmission 4 is adjusted to GN value and the vehicle is thereby caused to stop, it is judged in the step 6 that the vehicle is stopping. That is, when the vehicle is caused to stop in this manner, in the step 6, the processing goes to 1-in-circle, where a (forward direction) starting control corresponding to the select position of the select lever is executed. When the select lever is operated before the transmission ratio of the toroidal continuously variable transmission 4 is adjusted to GN value, in the steps 1, 5 and 12, judgments corresponding to the operated positions of the select lever are carried out and a transmission control corresponding to the judgments is executed.

On the other hand, in the step 5, when it is judged that the select position of the select lever is not the forward running position (D or L range), the processing goes to a step 12, where it is checked whether the select position of the select lever is the backward running position (R range) or not. In the step 12, when it is judged that the select position of the select lever is not the backward running position (R range), the present operation is ended (the processing goes back to the start). On the other hand, in the step 12, when it is judged that the select position of the select lever is the backward running position (R range), in the next step 13, it is checked whether the vehicle is running or not. This judgment is carried out similarly to the steps 2 and 6. In the step 13, when it is judged that the running speed of the vehicle is 0 km/h (the vehicle is not running), the processing goes to 3-in-circle (a normal backward direction start control is executed) and then the present operation is ended (the processing goes back to the start). In this case, the transmission ratio of the toroidal continuously variable transmission 4 is adjusted to the point D (1.88~1.94) shown in FIG. 4 based on the driving of the correction cylinder 23 and stepping motor 17 and then the present operation is ended (the processing goes back to the start). In the step 13, when it is judged that the running speed is not 0 km/h (the vehicle is running), in the next step 14, it is checked whether the vehicle is running forward or not. This operation is carried out similarly to the step 7.

In the step 14, when it is judged that the vehicle is not running forward (the vehicle is running backward), the processing goes to 4-in-circle (a normal backward direction transmission control is executed) and then the present operation is ended (the processing goes back to the start). In this case, the transmission ratio of the toroidal continuously variable transmission 4 is adjusted to a target transmission ratio corresponding to the vehicle running state (the vehicle speed, the throttle position and the like) based on the driving of the stepping motor 17 (a normal backward direction transmission control is executed). In the step 14, when it is judged that the vehicle is running forward, the processing goes to the next step 15. That is, based on the judgments of the steps 1, 5, 12~14, although the vehicle is running forward, it can be judged that the select lever has been operated to the backward running position (R range) existing in the reverse direction to the vehicle running direction. Therefore, in the step 15 and in its following steps 16~18, there is carried out an operation to decelerate and stop the vehicle safely and quickly.

Firstly, in the step 15, similarly to the step 8, the correction cylinder 23 is driven according to the operation of the select lever to thereby check whether the transmission ratio of the toroidal continuously variable transmission 4 has been corrected based on the driving of the stepping motor 17 by an amount corresponding to the variation thereof from the value {the transmission ratio has been returned to (the vicinity of) the value} or not. In the step 15, when it is judged that the correction operation (the operation to return the transmission ratio) is not carried out yet, as shown in the step 16, the stepping motor 17 is driven at the maximum speed (for example, 1 step/1 ms) by an amount corresponding to, for example, 60 steps in a direction equivalent to the reverse direction to a direction where the transmission ratio is varied by the correction cylinder 23 (and then the present operation is ended and the processing goes back to the start). This processing is almost similar to the step 9 except that the running direction of the vehicle and the operation position of the select lever are different. On the other hand, in the step 15, when it is judged that the operation to return the transmission ratio has been already carried out (that, after the operation of the step 16 is executed, the processing arrives again at the step 15), the processing goes to the step 17. In the step 17, similarly to the above-mentioned step 10, the transmission ratio of the toroidal continuously variable transmission 4 is set for GN value (the point C in FIG. 4: 1.7).

And, in the next step 1, in order to decelerate and stop the vehicle based on the engine brake force, the transmission ratio of the toroidal continuously variable transmission 4 is shifted toward GN value under a given condition, for example, under the condition of a shifting speed β {the transmission ratio shift is started and then the present operation is ended (the processing goes back to the start)}. Here, such transmission ratio shift, similarly to the above-mentioned step 11, is carried out based on the driving of the stepping motor 17. The shifting speed β is also previously set experimentally or by simulation for a value (for example, for the drive speed of the stepping motor, 1 step/20 ms) which belongs to the group of values capable of preventing the sudden change of the vehicle behavior and the damage of the vehicle and continuously variable transmission apparatus and can reduce the speed ratio of the continuously variable transmission apparatus continuously and as quickly as possible. Of course, the shifting speed β can also be adjusted according to the vehicle running state (such as the vehicle speed and the decelerating speed) (that is, it can be adjusted to a tuning value). Anyhow, when the transmission ratio of the toroidal continuously variable transmission 4 is varied toward GN value under the condition of the thus set shifting speed β, the vehicle can be decelerated and stopped based on the engine brake force without incurring the sudden behavior change or damage of the vehicle. By the way, when the transmission ratio of the toroidal continuously variable transmission 4 is adjusted to GN value and the vehicle is thereby stopped, in the step 13, it is judged that the vehicle is stopping. That is, when the vehicle is caused to stop in this manner, the processing goes to 3-in-circle, where a (backward direction) start control corresponding to the select position of the select lever is executed. When the select lever is operated before the transmission ratio of the toroidal continuously variable transmission 4 is adjusted to GN value, in the steps 1, 5 and 12, judgments corresponding to such operations are carried out and thus transmission controls corresponding to such judgments are executed.

Since a transmission control device for a continuously variable transmission apparatus according to the present embodiment is structured and operates in the above-mentioned manner, even when the select lever is operated to a select position in the reverse direction to the vehicle running direction, not only the sudden behavior change of the vehicle as well as the damages of the vehicle and continuously variable transmission apparatus can be prevented, but also the vehicle can be decelerated or stopped safely and quickly. Further the vehicle is allowed to run in such a manner as corresponds to the position to which the select lever is operated. That is, the present embodiment not only can prevent the sudden behavior changes and damages of the vehicle possibly caused by, for example, the wrong operation of the select lever by the driver, but also, when the driver operates the select lever intentionally in a state where the braking force of the brake device cannot be obtained, can decelerate and stop the vehicle safely and quickly based on the engine brake force. Since the vehicle can be run from the stopping state in a direction corresponding to the operated position of the select lever based on the adjustment of the transmission ratio of the toroidal continuously variable transmission 4, even when the driver intentionally operates the select lever to the select position in the reverse direction to the vehicle running direction, for example, in order to put the vehicle into the garage, the driver can drive the vehicle as the driver wants without incurring the sudden behavior changes and damages of the vehicle. Accordingly, the foolproof and fail-safe functions of the vehicle can be secured and the driver's intentional vehicle running can be secured.

According to the present embodiment, as described above, the correction cylinder 23 is operated based on (the switching of the manual oil pressure switch valve 31 and thus the switching of the forward/backward switch valve 41 based on) the operation of the select lever, and, when starting the vehicle, a necessary drive force (creep force) can be outputted from the output shaft 9. Besides such function, the correction cylinder 23 has another function: that is, when the correction cylinder 23 is operated based on the switching of the electromagnetic valve 19 (and thus the switching of the correcting control valves 24a and 24b) according to the control signal of the control unit 16, the transmission ratio of the toroidal continuously variable transmission 4 and thus the torque passing through the toroidal continuously variable transmission 4 (passing torque) can be adjusted. Although not shown, for example, the present invention can also be applied to a structure which introduces the pressurized oil from a manual switch valve into the correction cylinder directly (for an example, please see Japanese Patent Application JP-P-2005-220581). That is, even in such structure, when the transmission control is executed along the flow chart of FIG. 3, there can be obtained the above-mentioned effect of the invention. When there is not employed the structure in which the correction cylinder 23 is operated along the operation of the select lever as in the present embodiment, it is also possible to omit, for example, the steps 8, 9 and steps 15, 16 respectively shown in FIG. 3.

Second Embodiment

Figure 6:
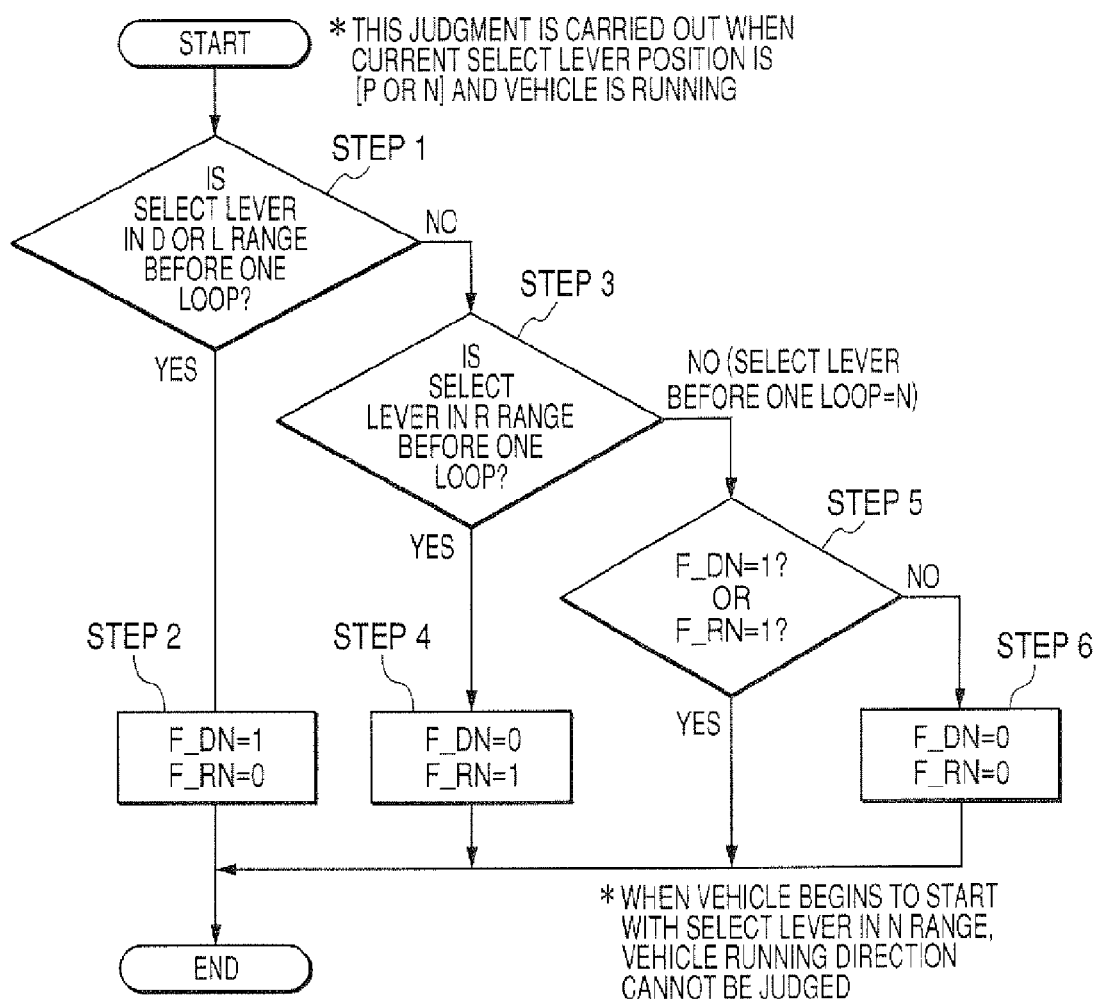
FIG. 6 is a flow chart of operations to be executed in order to check whether a select lever is operated to a select position in the reverse direction to the vehicle running direction.

Now, FIGS. 5 and 6 show a second embodiment of the invention. In the first embodiment, whether the select lever is operated to the select position in the reverse direction to the vehicle running direction or not is checked based on the current select position of the select lever and the running direction of the vehicle obtained from the detect signals of the rotation sensors (the input side and output side rotation sensors 33 and 34 shown in FIG. 1) and the like. On the other hand, in the second embodiment, whether the select lever is operated to the select position in the reverse direction to the current vehicle running direction or not is checked without using the detect signals of such rotation sensors. For this reason, in the second embodiment, when the select lever is operated to N range while the vehicle is running, the select position of the select lever just before execution of this operation is previously stored. When the select lever is operated from N range before the vehicle stops, it is checked whether the thus operated select position and the stored select position are the same or not; and, it is checked from this checking result whether the select lever is operated to the select position in the reverse direction to the vehicle running direction. Specifically, after the step 2 shown in FIG. 5 (between the steps 2 and 4), the operation to judge and store the select position of the select lever just before it is operated to N range is carried out. Such judgment and storage operation is carried out along the procedure that is provided in a flow chart of FIG. 6. That is, in the steps 1 and 2 of the flow chart of FIG. 5, when it is judged that the vehicle is running and the select lever is held in N range (normally, the vehicle does not run while the select lever is held in P range), the processing goes to a step 1 shown in FIG. 6. In the step 1, it is checked whether the select lever is operated to the select position in the reverse direction to the vehicle running direction or not is judged or not. That is, it is checked according to the detect signal of the position switch 39 (see FIG. 1) (since such detect signal is normally monitored) whether the select position of the select lever before the processing goes to the step 1 of the flow chart of FIG. 6 is the forward running position (in D or L range) or not.

In the step 1, when it is judged that the select position of the select lever before it is operated to N range is the forward running position (D or L range) (D or L ranges->N range), the processing goes to a step 2, where, in order to store this select position, of flags F_DN and F_RN, the flag F_DN is set for 1 (F_DN=1, F_RN=0), and this operation is ended (the processing goes to a step 4 shown in FIG. 5). On the other hand, in the step 1, when it is judged that the select position of the select lever before it is operated to N range is not the forward running position (D or L range), the processing goes to a step 3. In this step 3, it is checked whether the select position of the select lever before it is operated to N range is the backward running position (R range) or not (R range->N range). In the step 3, when it is judged that the select position of the select lever before it is operated to N range is the backward running position (R range), the processing goes to a step 4, where, in order to store this select position, of the flags F_DN and F_RN, the flag F_RN is set for 1 (F_DN=0, F_RN=1), and this operation is ended (the processing goes to a step 4 shown in FIG. 5).

On the other hand, in the step 3, when it is judged that the select position of the select lever before it is operated to N range is not the backward running position (R range), the processing goes to a step 5. In the step 5, it is checked whether any one of the flags F_DN and F_RN is 1 or not. In other words, it is checked whether the position of the select lever just before is in N range (in N range, the vehicle starts to run from its stopping state) or not. In the step 5, when it is judged that any one of the flags F_DN and F_RN is 1, the operation is ended as it is (the processing goes to a step 4 shown in FIG. 5). Also, when neither of the flags F_DN and F_RN is 1, that is, when F_DN=0, F_RN=0 (when the position of the select lever just before is in N range) as well, in a step 6, this is confirmed and the operation is ended (the processing goes to the step 4 shown in FIG. 5).

Anyhow, when the operation to judge and store the select position of the select lever just before it is operated to N range (the operation to set the flags) along the procedure of the flow chart of FIG. 6, the processing goes to the step 4 shown in FIG. 5 while the setting of the flags is maintained and, the control of the speed ratio of the continuously variable transmission apparatus (control of the transmission ratio of the toroidal continuously variable transmission 4) is continued along the flow chart of FIG. 5. In this case, for example, in the steps 2, 6 and 13, when it is judged that the vehicle has stopped, the flags are cleared (F_DN=0, F_RN=0). In a step 7, it is checked whether R_RN=1 or not. That is, whether the vehicle has been running backward in R range before the select lever is operated to D range and the vehicle is currently running backward in D range or not is checked depending on whether F_RN=1 or not. In the step 7, when it is judged that F_RN=1, it can be considered that the vehicle is running backward in spite of the select lever being held in D range Therefore, the processing goes to a step 8, where there is executed an operation to decelerate and stop the vehicle safely and quickly.

On the other hand, in the step 7, when it is judged that F_RN is not 1, it can be considered that the vehicle is running forward. Therefore, the processing goes to 2-in-circle (a normal transmission control in the forward direction is carried out). In a step 14, it is checked whether F_DN=1 or not. That is, whether the vehicle has been running forward in D range before the select lever is operated to R range and the vehicle is currently running forward in R range is checked depending on whether F_DN is 1 or not. In the step 14, when it is judged that F_DN is 1, it can be considered that the vehicle is running forward in spite of the select lever being held in R range. Therefore, the processing goes to a step 15, where there is executed an operation to decelerate and stop the vehicle safely and quickly. On the other hand, in the step 14, when it is judged that F_DN is not 1, it can be considered that the vehicle is running backward with the select lever being held in R range and, therefore, the processing goes to 4-in-circle (a normal transmission control in the backward direction is carried out).

In the second embodiment, when the vehicle starts from its stopping state while the select lever is operated to N range (in FIG. 6, when the processing goes to the step 6), it is impossible to check accurately whether the select lever is operated to the select position in the reverse direction to the vehicle running direction or not. In other words, when the vehicle starts from the stopping state in this manner, if the select lever is operated from N range to D, L ranges or to R range, even if the select lever is operated to the select position in the reverse direction to the vehicle running direction, it is judged that the select lever is operated in the same direction as the vehicle running direction. That is, because the flag F_DN is 0 and flag F_RN is 0, in the step 7, the processing always goes to 2-in-circle; or, in the step 14, the processing always goes to 4-in-circle. However, such case is a very limited case such as a case when the vehicle descends a slope from the stopping state, the vehicle speed in this case is very low, and thus there is a very low possibility that, in this case, a driver can operate the select lever to the select position in the reverse direction to the vehicle running direction. Therefore, it is believed that the employment of the structure according to the second embodiment is hard to give rise to inconveniences.

The other remaining structures and operations of the second embodiment are similar to those of the previously described first embodiment. Specifically, the number of steps used in the second embodiment is made to correspond to the number of steps in the first embodiment (the operations to be carried out in the other steps than the steps 7 and 14 are the same as in the first embodiment) and thus the duplicate description thereof is omitted here.

EXAMPLE

Figure 7:
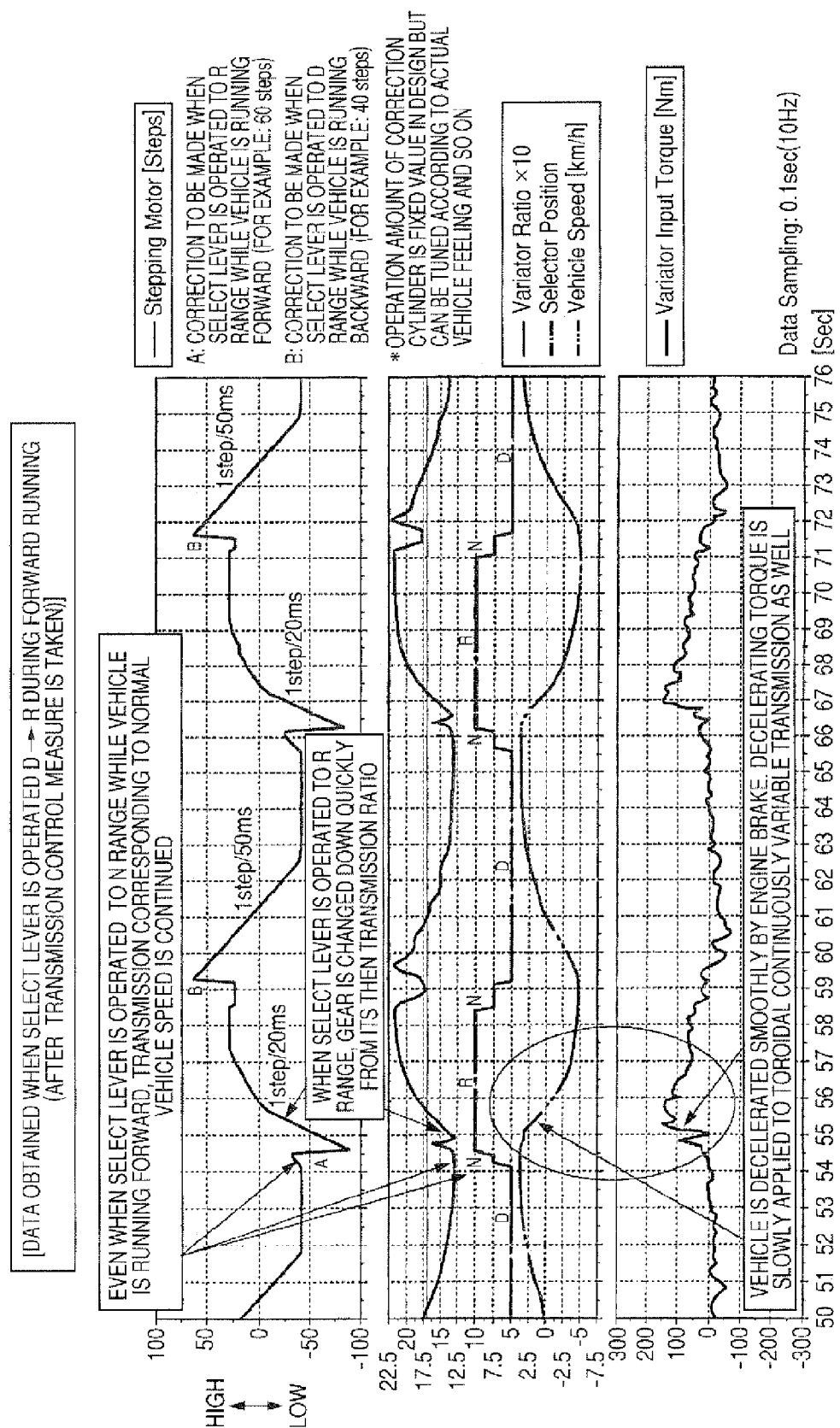
FIG. 7 is a graphical representation of the behavior of a vehicle when transmission control is executed by a transmission control device according to the invention.
Figure 8:
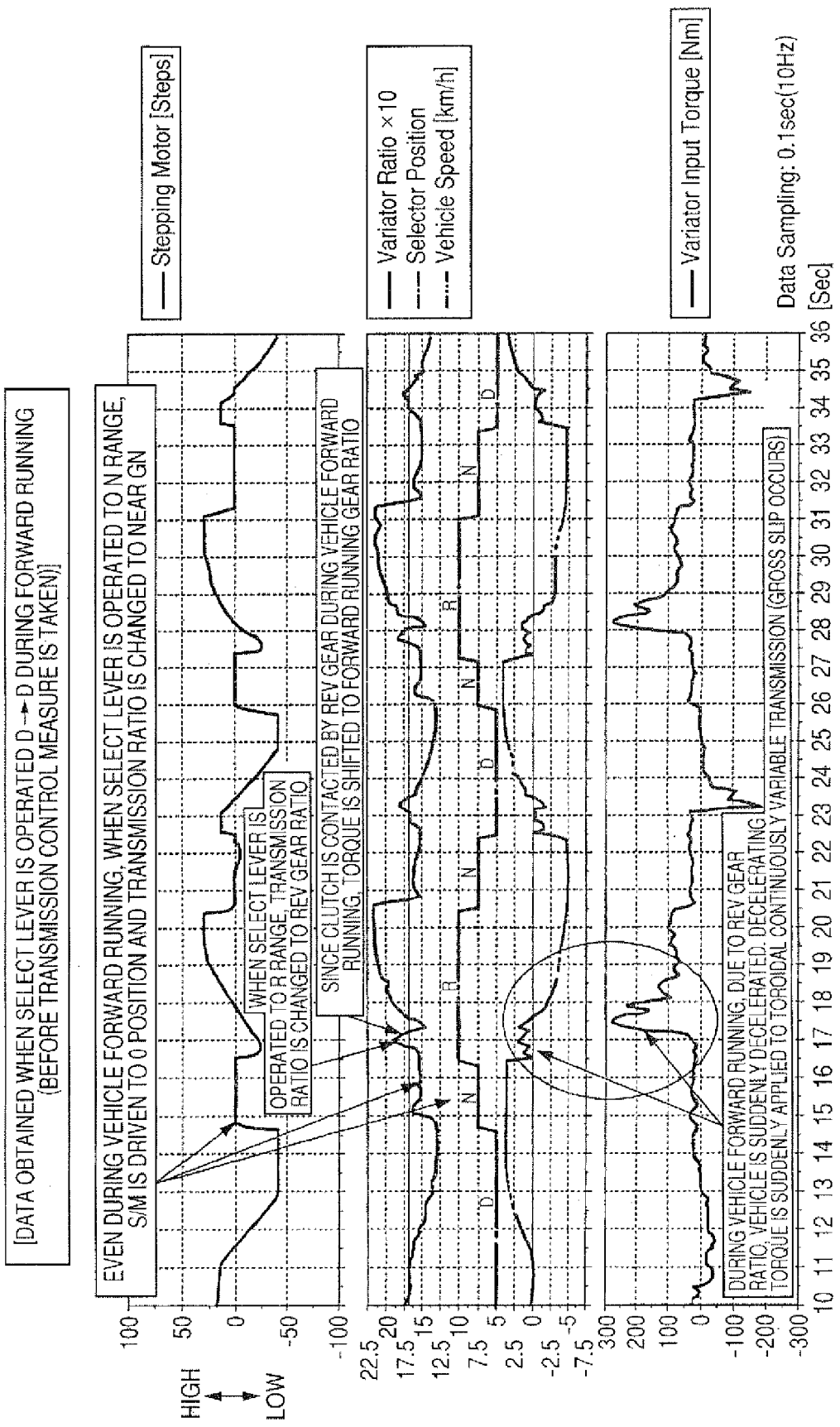
FIG. 8 is a graphical representation of the behavior of a vehicle when transmission control is not executed by a transmission control device according to the invention.

FIGS. 7 and 8 show the results of the tests that have been conducted in order to confirm the effects of the invention. Of these two figures, FIG. 7 shows the vehicle behavior on which transmission control is executed by a transmission control device according to the invention. FIG. 8 shows the vehicle behavior on which transmission control is not executed by a transmission control device according to the invention. More specifically, FIG. 8 shows the vehicle behavior not only in the case where the transmission ratio of a toroidal continuously variable transmission (Variator) is adjusted to GN value when the select lever is operated to N range but also in the case where, when the select lever is operated to the select position in the reverse direction to the vehicle running direction, the transmission ratio is adjusted to a transmission ratio corresponding to the thus operated select position. As can be seen obviously from comparison of FIGS. 7 and 8, according to the transmission control device of the continuously variable transmission apparatus of the invention, even when the select lever is operated to the select position in the reverse direction to the current vehicle running direction, not only the sudden behavior change of the vehicle but also the damage of the vehicle and continuously variable transmission apparatus can be prevented; and thus, the vehicle can be decelerated and stopped safely and quickly and further, the vehicle can be made to run in such a manner as to corresponds to the position to which the select lever is operated.

INDUSTRIAL APPLICABILITY

The present invention can be enforced by using not only a toroidal continuously variable transmission of a half-toroidal but also a toroidal continuously variable transmission of a full-toroidal.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A transmission control device for continuously variable transmission apparatus, comprising:
a continuously variable transmission comprising:
a toroidal continuously variable transmission;
a differential mechanism having plurality of gears; and
a clutch which switches power transmitting path among the toroidal continuously variable transmission and differential mechanism; and
a control unit which adjusts a speed ratio of the continuously variable transmission, wherein
a rotation state of an output shaft is capable of switching between a forward rotation state and a reverse rotation state via a stopping state, while continuously rotating an input shaft in one-way direction, by changing a relative speed of the gears of the differential mechanism based on an adjustment of a transmission ratio of the toroidal continuously variable transmission, and
the control unit performs:
obtaining a target speed ratio of the continuously variable transmission based on a running state of a vehicle which is obtained at least a running speed of the vehicle and an throttle position, and adjusting the speed ratio to the thus obtained target speed ratio; and
when the vehicle is running and a select lever is operated to a select position which runs the vehicle in a reverse direction relative to a vehicle running direction, changing the speed ratio from a value corresponding to a current running state to zero which makes the vehicle stop along with a predetermined condition, while maintaining an engagement state of the clutch.

2. The transmission control device according to claim 1, wherein after adjusting the speed ratio to zero, the control unit adjusts the speed ratio from zero to a value corresponding to the select position of the select lever.

3. The transmission control device according to claim 1, wherein when the vehicle runs forward while the select lever is in a forward position and then the select lever is operated to a backward position, the control unit adjusts the speed ratio from a value corresponding to the forward position of the select lever to zero, and then adjusts the speed ratio from zero to a value corresponding to the backward position of the select lever.

4. The transmission control device according to claim 1, wherein when the vehicle runs backward while the select lever is in a backward position and then the select lever is operated to a forward position, the control unit adjusts the speed ratio from a value corresponding to the backward position of the select lever to zero, and then adjusts the speed ratio from zero to a value corresponding to the forward position of the select lever.

5. The transmission control device according to claim 1, wherein the clutch comprises:
a low speed clutch which is engaged when achieving a low speed mode that makes a deceleration ratio large, and which is disengaged when achieving a high speed mode that makes the deceleration ratio small; and
a high speed clutch which is engaged when achieving the high speed mode, and which is disengaged when achieving the low speed mode.

6. The transmission control device according to claim 1, wherein the toroidal continuously variable transmission comprises:
a pair of disks supported so as to be coaxially and freely rotate each other;
plurality of power roller interposed and held between the disks;
plurality of support member which supports respective power rollers rotatably; and
a hydraulic actuator which displacing the respective support members so as to change a transmission ratio between the disks.

\* \* \* \* \*